US007041265B2

(12) United States Patent
Ishida et al.

(10) Patent No.: US 7,041,265 B2
(45) Date of Patent: May 9, 2006

(54) ALKALINE EARTH METAL-BASIC SILICATE PARTICLE

(75) Inventors: Hitoshi Ishida, Tokyo (JP); Yoshinobu Komatsu, Tokyo (JP); Hiroshi Enoki, Tokyo (JP); Kazunori Sakao, Tokyo (JP); Katsumi Higuchi, Tokyo (JP); Kouji Inoue, Tokyo (JP); Junichi Nakajima, Tokyo (JP)

(73) Assignee: Mizusawa Industrial Chemicals, Tokyo (JP)

( * ) Notice: Subject to any disclaimer, the term of this patent is extended or adjusted under 35 U.S.C. 154(b) by 137 days.

(21) Appl. No.: 10/484,384

(22) PCT Filed: Jul. 24, 2002

(86) PCT No.: PCT/JP02/07503

§ 371 (c)(1),
(2), (4) Date: Mar. 29, 2004

(87) PCT Pub. No.: WO03/010091

PCT Pub. Date: Feb. 6, 2003

(65) Prior Publication Data

US 2004/0147660 A1  Jul. 29, 2004

(30) Foreign Application Priority Data

Jul. 26, 2001 (JP) .............................. 2001-225723

Sep. 25, 2001 (JP) .............................. 2001-292402

(51) Int. Cl.
*C01B 33/24* (2006.01)
*C01B 33/22* (2006.01)
(52) U.S. Cl. ..................... 423/331; 501/122; 501/123; 106/461; 524/442; 524/456
(58) Field of Classification Search ............... 524/442, 524/456; 106/461; 501/122, 123; 423/331
See application file for complete search history.

(56) References Cited

U.S. PATENT DOCUMENTS 3,778,494 A * 12/1973 Helser ........................ 264/82
4,789,510 A * 12/1988 Toda ........................ 264/612

FOREIGN PATENT DOCUMENTS

JP       02-289420 A1 * 11/1990
WO    WO 9604217 A1 *  2/1996

* cited by examiner

*Primary Examiner*—David Sample
(74) *Attorney, Agent, or Firm*—Sherman & Associates

(57) ABSTRACT

Alkaline earth metal basic silicate particles having a silicate of an alkaline earth metal on the surfaces of the alkaline earth metal hydroxide particles, and having an $SiO_2/MO$ (M is an alkaline earth metal) molar ratio as a whole in a range of from 0.01 to 0.90. The particles are useful as a stabilizer for the chlorine-containing polymers.

20 Claims, 8 Drawing Sheets

ALKALINE EARTH METAL-BASIC SILICATE PARTICLE

TECHNICAL FIELD

The present invention relates to alkaline earth metal basic silicate particles useful as a stabilizer for chlorine-containing polymers and to a method of producing the same.

BACKGROUND ART

When exposed to heat and light, a chlorine-containing polymer such as a vinyl chloride resin permits hydrogen chloride to be removed from the molecular chains thereof, resulting in the occurrence of decomposition, discoloration and drop of physical properties. It has been known that the causes of discoloration and drop of physical properties are due to the formation of a polyene structure. To stabilize the vinyl chloride resin against the heat decomposition, there have heretofore been proposed and widely used various kinds of stabilizers or stabilizer compositions.

As stabilizers for chlorine-containing polymers, there have also long been known to use hydroxides or silicates of alkaline earth metals and organotin stabilizers, as well as organotin stabilizers and other inorganic stabilizers in combination.

Japanese Unexamined Patent Publication (Kokai) No. 102770/1974 discloses a chlorine-containing high molecular compound composition having a hydrogen chloride gas-trapping property obtained by adding, to a chlorine-containing high molecular compound, a calcium hydroxide in an amount of not smaller than one-half the amount of chlorine contained in the high molecular compound, and kneading them together.

Japanese Unexamined Patent Publication (Kokai) No. 97648/1979 discloses a halogen-containing resin composition obtained by blending 100 parts of a halogen-containing resin with (a) from 0.1 to 2.5 parts of a basic magnesium carbonate, (b) from 0.1 to 5 parts of one or two or more compounds selected from alkaline earth metal salts and zinc salts of organic acids, (c) from 0.1 to 5 parts of a dipentaerythritol, (d) from 0.1 to 10 parts of a lubricant, and (e) from 0 to 20 parts of a filler selected from calcium carbonate, clay, titanium oxide and carbon black.

Japanese Unexamined Patent Publication (Kokai) No. 43144/1980 discloses a vinyl chloride resin molding material obtained by blending a hard vinyl chloride resin composition with from 2 to 20 PHR of fine calcium carbonate treated with a fatty acid, from 0.3 to 3.0 PHR of at least either a magnesium oxide or a magnesium hydroxide, and from 0.2 to 2.0 PHR of at least either a dibutyltin dilaurate or a dibutyl-β-mercaptopropionate.

Japanese Unexamined Patent Publication (Kokai) No. 262941/1993 discloses a vinyl chloride resin composition obtained by blending a vinyl chloride resin with (a) at least one compound selected from the group consisting of magnesium oxide, magnesium carbonate and magnesium hydroxide, (b) a calcium oxide and/or a calcium hydroxide, (c) a zinc salt of an organic acid, and an organic phosphorus ester.

Japanese Unexamined Patent Publication (Kokai) No. 1898/1994 discloses a blending agent for chlorine-containing polymers, comprising a homogeneous composition of a crystalline layered magnesium phyllosilicate and a magnesium hydroxide or a magnesium oxide, the molar composition ratio of $SiO_2/MgO$ as a whole being in a range of from 0.25 to 1.33. In Comparative Example 1 of this publication, there has been described that a composition having an $SiO_2/MgO$ molar composition ratio of 0.10 fails to exhibit heat stability to a sufficient degree.

Japanese Unexamined Patent Publication (Kokai) No. 62182/1995 discloses a polyvinyl chloride resin composition comprising a polyvinyl chloride resin and a calcium hydroxide of a particle diameter of not larger than 40 μm.

Japanese Patent No. 2895108 discloses a composite stabilizer for chlorine-containing polymers, comprising from 0.5 to 1.7 parts by weight of a calcium hydroxide or a magnesium hydroxide, from 0.05 to 0.4 parts by weight of a metallic soap-type stabilizer and from 0.1 to 0.4 parts by weight of perchloric acid per part by weight of a zeolite-type stabilizer.

The calcium hydroxide and magnesium hydroxide are bases of typical divalent metals, and are presumed to be highly capable of trapping (reacting) hydrogen chloride per a unit weight. When really used as a stabilizer for the chlorine-containing polymers, however, they tend to initially color the chlorine-containing polymers to a warm color close to red and, besides, their heat stabilization time (time until the chlorine-containing polymer becomes blackened) is not as long as expected. Therefore, the calcium hydroxide and the magnesium hydroxide have simply been used as assistant components for the stabilizer as is done in the prior art.

The reason that the calcium hydroxide or magnesium hydroxide has a large tendency for imparting the initial color and does not have so long heat stabilization time is attributed to that the hydroxide is strongly basic and is rather inducing the reaction (polyene-forming reaction) for removing hydrogen chloride from the chlorine-containing polymer.

DISCLOSURE OF THE INVENTION

The present inventors have got an idea in that if an alkaline earth metal silicate is formed on the surfaces of alkaline earth metal hydroxide particles, a direct contact is avoided between the alkaline earth metal hydroxide and the chlorine-containing polymer, whereby an initial coloring tendency is avoided when used as a stabilizer, and heat stability is improved.

Based upon this idea, the present inventors have succeeded in producing alkaline earth metal basic silicate particles by forming an alkaline earth metal silicate salt on the surfaces of the alkaline earth metal hydroxide particles, and have discovered the fact that the alkaline earth metal basic silicate particles exhibit a strikingly suppressed initial coloring tendency and a strikingly extended heat stabilization time.

It is therefore an object of the present invention to provide alkaline earth metal basic silicate particles having a novel particle structure, i.e., having a particle structure in which an alkaline earth metal silicate exists on the surfaces of the alkaline earth metal hydroxide particles, and a method of producing the same.

Another object of the present invention is to provide alkaline earth metal basic silicate particles exhibiting markedly decreased initial coloring tendency for the chlorine-containing polymers, offering a strikingly extended heat stabilization time and, as a result, lending the particles particularly useful as a stabilizer for the chlorine-containing polymers and a method of producing the same.

A further object of the present invention is to provide a chlorine-containing polymer composition containing the alkaline earth metal basic silicate particles, and exhibiting improved initial coloring property.

According to the present invention, there is provided alkaline earth metal basic silicate particles having a silicate of an alkaline earth metal on a surface of an alkaline earth metal hydroxide particles, and having an SiO$_2$/MO (M is an alkaline earth metal) molar ratio as a whole in a range of from 0.01 to 0.90.

In the alkaline earth metal basic silicate particles of the present invention, it is desired that:

(a) the alkaline earth metal hydroxide is a calcium hydroxide and/or a magnesium hydroxide;
(b) the alkaline earth metal hydroxide is a magnesium, and a time in which 50 mol % (calculated as MgO) of 50 mg of the basic silicate particles dissolves is not shorter than 5 minutes in the acid resistance testing based on the pH-stat method;
(c) the alkaline earth metal silicate is a magnesium silicate, and a silicification intensity ratio (RI400) as expressed by the following formula (1), $$RI_{400} = A/B \quad (1)$$

wherein A is a $^{28}Si^+$ intensity profile [counts] at 400 nm in the direction of depth from the surfaces of the particles, and B is a $^{25}Mg^+$ intensity profile [counts] at 400 nm in the direction of depth from the surfaces of the particles, is not smaller than 0.01 as measured by the secondary ion mass spectrometry (SIMS);

(d) the alkaline earth metal hydroxide is a magnesium hydroxide, and the SiO$_2$/MgO molar ratio as a whole is in a range of from 0.01 to 0.40;
(e) the alkaline earth metal hydroxide comprises a calcium hydroxide and a magnesium hydroxide, calcium and magnesium existing at a Ca/Mg molar ratio of from 0.01 to 100;
(f) has a peak based on the weight loss at a temperature of from 350 to 450° C. in the scanning thermogravimetric analysis (DTG);
(g) water of hydration (water existing as a hydroxyl group) is present in an amount of from 0.1 to 0.99 mols per mol of MO (M=alkaline earth metal);
(h) has a BET specific surface area of from 10 to 200 m$^2$/g and an oil-absorbing amount of from 10 to 150 ml/100 g; and
(i) a median diameter based on the volume is in a range of from 0.1 to 20 μm.

According to the present invention, there is further provided a method of producing alkaline earth metal basic silicate particles by heating alkaline earth metal hydroxide particles and amorphous silicic acid in an aqueous medium under a non-milling condition, and forming an alkaline earth metal silicate on the surfaces of the alkaline earth metal hydroxide particles based upon the reaction of the alkaline earth metal hydroxide and the amorphous silicic acid, followed by dry solidification.

According to the present invention, further, there is provided a stabilizer for chlorine-containing polymers, comprising the alkaline earth metal basic silicate particles.

Further, the alkaline earth metal basic silicate particles can be used as a stabilizer for the chlorine-containing polymers in combination with zeolite, organotin stabilizer or perchloric acid. Upon blending the chlorine-containing polymer with the above stabilizer, there is provided a stabilized chlorine-containing polymer composition.

In particular, it is desired that the stabilizer combined with the organotin stabilizer further contains a higher aliphatic acid or a zinc salt of resin acid or a boric acid compound.

BEST MODE FOR CARRYING OUT THE INVENTION

Figure 1:
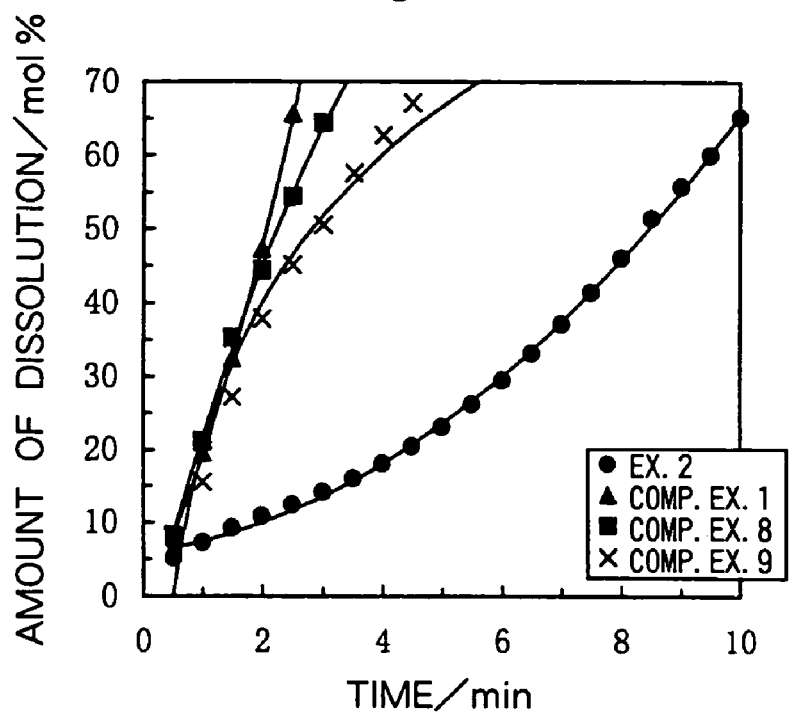
FIG. 1 is a diagram showing curves of dissolution by the pH-stat method.

The alkaline earth metal basic silicate particles of the present invention have a feature in that:

A. an alkaline earth metal silicate is formed on the surfaces of the alkaline earth metal hydroxide particles; and
B. an SiO$_2$/MO (M is an alkaline earth metal) molar ratio as a whole is in a range of from 0.01 to 0.90.

The alkaline earth metal silicate present on the surfaces of the particles works to markedly suppress the initial coloring tendency toward the warm color system when it is mixed into the chlorine-containing polymer. The alkaline earth metal hydroxide present in the particles, on the other hand, works to effectively trap hydrogen chloride generated from the chlorine-containing polymer. Thus, the alkaline earth metal basic silicate particles having the particle structure defined by the present invention work to strikingly extend the blackening time of the chlorine-containing polymer while markedly suppressing the initial coloring tendency, and further exhibit excellent resistance against the blooming.

Reference should be made to Examples and Comparative Examples appearing later.

When the vinyl chloride resin is blended with the magnesium hydroxide in an amount of 0.7 PHR (blended number of parts per 100 parts by weight of the resin, hereinafter the same) together with other stabilizer assistants, the initial color is evaluated to be level 3, and the blackening time in the Geer's oven at 185° C. is 80 minutes (Comparative Example 1).

On the other hand, when the vinyl chloride resin is blended with the magnesium silicate (talc) in an amount of 0.7 PHR together with other stabilizer assistants, the initial color is evaluated to be level 1, and the blackening time in the Geer's oven at 185° C. is 60 minutes (Comparative Example 2).

Further, when the vinyl chloride resin is blended with a mixture of the magnesium hydroxide and the magnesium silicate at a molar ratio of 8:1 ($SiO_2$/MgO molar ratio=0.1/ 0.9) in an amount of 0.7 PHR together with other stabilizer assistants, the initial color is evaluated to be level 3, and the blackening time in the Geer's oven at 185° C. is 70 minutes (Comparative Example 3).

On the other hand, when the vinyl chloride resin is blended with the mixture of $SiO_2$ and MgO at the same molar ratio as that of Comparative Example 3 but having the magnesium silicate formed on the surfaces of the magnesium hydroxide particles in an amount of 0.7 PHR together with other stabilizer assistants, the initial color is evaluated to be level 1, and the blackening time in the Geer's oven at 185° C. is extended to 100 minutes (Example 1).

These experimental results indicate that the particle structure having the silicate on the surfaces and the hydroxide in the inside, is synergistically playing the role of preventing the initial coloring and improving the heat stability.

The above action and effect are similarly achieved even when the calcium hydroxide and the magnesium hydroxide are contained in combination as the alkaline earth metal hydroxide as demonstrated in Examples appearing later.

In the alkaline earth metal basic silicate particles of the present invention, it is also important that the $SiO_2$/MO (M is an alkaline earth metal) as a whole is in a range of from 0.01 to 0.90 and, more preferably, from 0.05 to 0.70 to achieve the above action and effect.

When the molar ratio is smaller than the above range, the effect of preventing the initial coloring tends to be deteriorated as compared to when the molar ratio lies in the above range. This is presumably due to a decrease in the thickness of the silicate layer formed on the surfaces of the alkaline earth hydroxide or to the lack of uniformity of the silicate layer.

When the molar ratio exceeds the above range, the heat stability tends to be deteriorated as compared to when the molar ratio lies in the above range. This is presumably due to a drop in the hydrogen chloride-trapping property since the alkaline earth metal hydroxide is converted into the silicate too much.

The alkaline earth metal basic silicate particles (hereinafter often referred to simply as basic silicate particles) of the present invention are produced by reacting an alkaline earth metal hydroxide with amorphous silicic acid (silica) as will be described later. Further, the alkaline earth metal hydroxide constituting the particulate skeleton includes a calcium hydroxide and a magnesium hydroxide, the calcium hydroxide exhibiting higher reactivity than the magnesium hydroxide to the amorphous silicic acid. Therefore, when the particulate skeleton is the calcium hydroxide, the basic silicate particles of the invention possesses a silicate formed on the surfaces thereof maintaining a thickness larger than that of when the particulate skeleton is the magnesium hydroxide. As a result, the behavior for the acid differs slightly and, besides, means differs slightly for confirming the presence of the silicate.

In the basic silicate particles (Mg type) having the magnesium silicate on the surfaces of the magnesium hydroxide particles, the time in which 50 mol % (calculated as MgO) of 50 mg of the basic silicate particles dissolves is not shorter than 5 minutes and, particularly, is not shorter than 7 minutes in the acid resistance testing based on the pH-stat method.

FIG. 1 shows curves of dissolution measured for the particles of Example 2 and Comparative Examples 1, 8 and 9 based on the pH-stat method. From FIG. 1, the time is 2 minutes and 4 seconds (Comparative Example 1) when the magnesium hydroxide alone is used, the time is 2 minutes and 15 seconds (Comparative Example 8) when a mixture of the magnesium hydroxide and silica (amorphous silicic acid) is used, the time is 2 minutes and 57 seconds (Comparative Example 9) when a mixture of the magnesium hydroxide and the magnesium silicate (talc) is used, and the time is 8 minutes and 27 seconds (Example 2) when the basic silicate particles of the Mg type of the invention is used, obviously needing the time for dissolution. From these results, it will be learned that the basic silicate particles of the Mg type of the present invention are different from a simple mixture of the magnesium hydroxide and the magnesium silicate.

Figure 2:
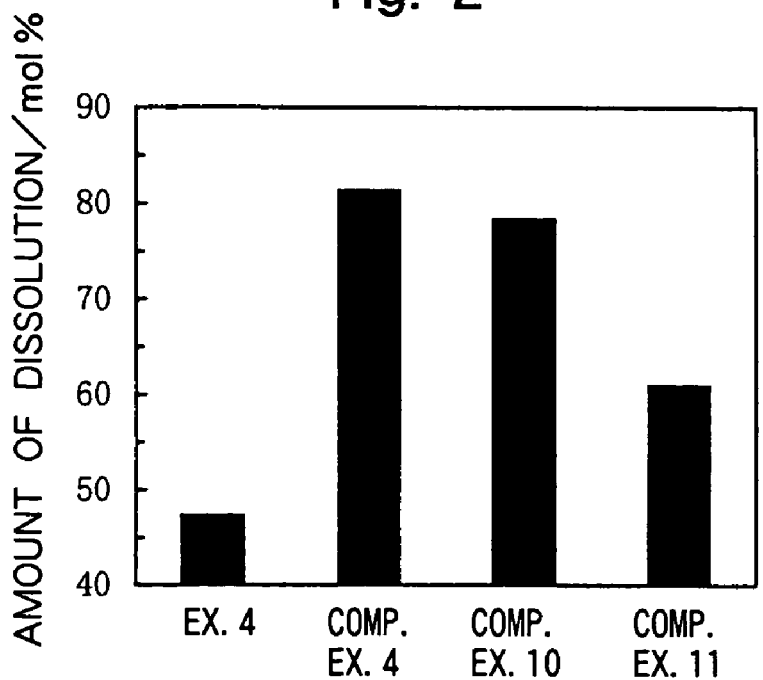
FIG. 2 is a graph showing the amounts of dissolution (% by mol calculated as CaO) of the basic silicate particles of when 0.1N HCL is automatically poured so that pH is 11.5.

FIG. 2 is a graph showing the amounts of dissolution (% by mol calculated as CaO) of the basic silicate particles (Ca type) when the alkaline earth metal hydroxide is the calcium hydroxide having the calcium silicate on the surfaces thereof and when 0.1N HCL is automatically poured so that pH is 11.5 by using an automatic stat measuring device. It will be learned from FIG. 2 that the amount of dissolution of the basic silicate particles of the Ca type of the present invention (Example 4) is 47.3% by mol, which is a very small amount of dissolution for the acid as compared to other particles (Comparative Examples 4, 10 and 11). It is learned from these results that the calcium silicate that dissolves little in the acid has been formed on the surfaces of the calcium hydroxide.

In the basic silicate particles of the Mg type, further, a silicification intensity ratio ($RI_{400}$) as expressed by the following formula (1), $$RI_{400} = A/B \quad (1)$$

wherein A is a $^{28}Si^+$ intensity profile [counts] at 400 nm in the direction of depth from the surfaces of the particles, and B is a $^{25}Mg^+$ intensity profile [counts] at 400 nm in the direction of depth from the surfaces of the particles, is not smaller than 0.01 as measured by the secondary ion mass spectrometry (SIMS).

Usually, when the surface of a solid material is irradiated with an ion beam of high energy (several KeV to 20 KeV), the atoms in the solid material are released as neutral atoms or ions due to the sputtering phenomenon. The SIMS is a method in which ions that are secondarily released (namely, secondary ions) are measured by a mass spectrometer to calculate a ratio (m/z) of mass/electric charge in order to conduct the elemental analysis and compound analysis of the solid surfaces. Further, the SIMS is capable of measuring the density profile for all elements in the direction of depth from the surface maintaining a high sensitivity.

Figure 3:
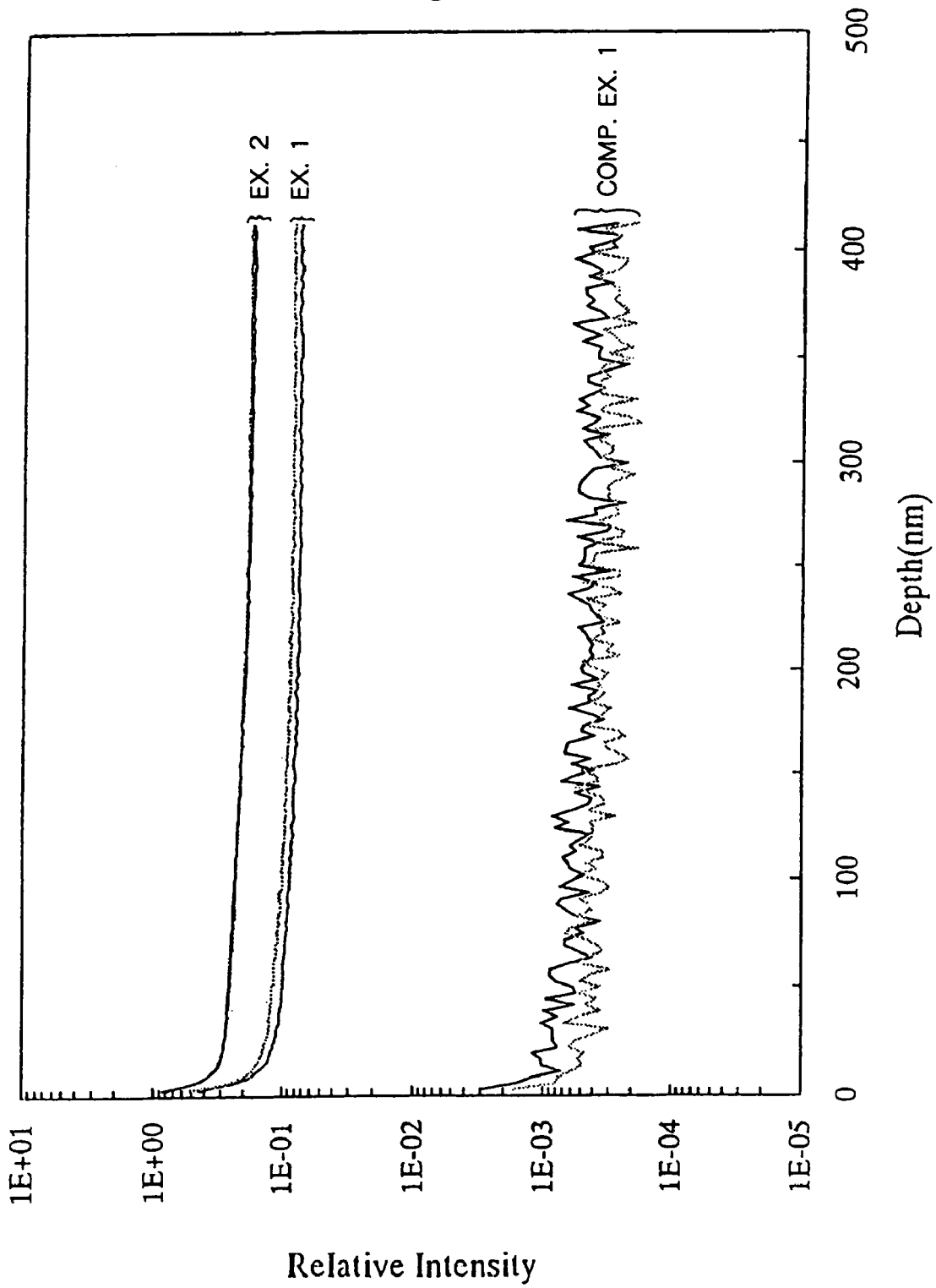
FIG. 3 is a diagram plotting the silicification intensity ratios expressed by the ratio ($^{28}Si^+$/$^{25}Mg^+$) of an intensity profile [counts] of $^{28}Si^+$ and an intensity profile [counts] of $^{25}Mg^+$ for the depth from the surfaces of the particles.

FIG. 3 is a diagram drawn by calculating the silicification intensity ratios expressed by the ratio ($^{28}Si^+/^{25}Mg^+$) of an intensity profile [counts] of $^{28}Si^+$ and an intensity profile [counts] of $^{25}Mg^+$ based on the above SIMS and by plotting the silicification intensity ratios for the depth from the surfaces of the particles. Here, the intensity profile of $^{28}Si^+$ represents the silica existing on the surfaces of the particles (magnesium hydroxide). As is obvious from FIG. 3, the basic silicate particles of the Mg type of the present invention has a silicification intensity ratio ($RI_{400}$) of not smaller than 0.01 at a depth of 400 nm from the surface of the particles (Examples 1 and 2), whereas the magnesium hydroxide has a silicification intensity ratio ($RI_{400}$) of about 0.0003 (Comparative Example 1). It is therefore learned that in the present invention, the magnesium silicate is existing on the surfaces of the particles.

In the basic silicate particles of the Mg type of the present invention, the magnesium silicate is existing on the surfaces to such an extent that the silicification intensity ratio ($RI_{400}$) is not smaller than 0.01. As a result, it is believed that the initial coloring property and heat stability are improved for the chlorine-containing polymer. That is, when the chlorine-containing polymer is blended with the basic silicate particles, the magnesium silicate existing on the surfaces of the particles prevents a direct contact between the magnesium hydroxide contained therein and the chlorine-containing polymer, preventing the extraction of hydrogen chloride from the chlorine-containing polymer by the magnesium hydroxide, suppressing the formation of polyene that is a cause of initial coloring and blackening, and permitting the magnesium hydroxide present therein to effectively trap hydrogen chloride generated from the chlorine-containing polymer.

In the basic silicate particles of the Mg type of the invention, further, it is desired that the molar ratio of $SiO_2/MgO$ as a whole is in a range of from 0.05 to 0.40 and, more preferably, from 0.05 to 0.30 from the standpoint of lowering the initial coloring tendency for the chlorine-containing polymer and for markedly extending the heat stabilization time. Further, though not experimentally confirmed yet, it is considered that the magnesium silicate on the surfaces of the basic silicate particles is existing at least partly in the form of a magnesium phyllosilicate. This is because, it has been confirmed that a synthetic layered magnesium phyllosilicate is formed by the reaction of the amorphous silicic acid with the magnesium hydroxide in amounts of a predetermined ratio as taught in the applicant's Japanese Patent No. 3153636 (Japanese Unexamined Patent Publication (Kokai) No. 1898/1994).

In the basic silicate particles of the invention, further, the fact that the silicate layer has been formed on the surfaces of the alkaline earth hydroxide can be confirmed by observing the surface shapes of the particles by using a scanning electron microphotograph.

Figure 4:
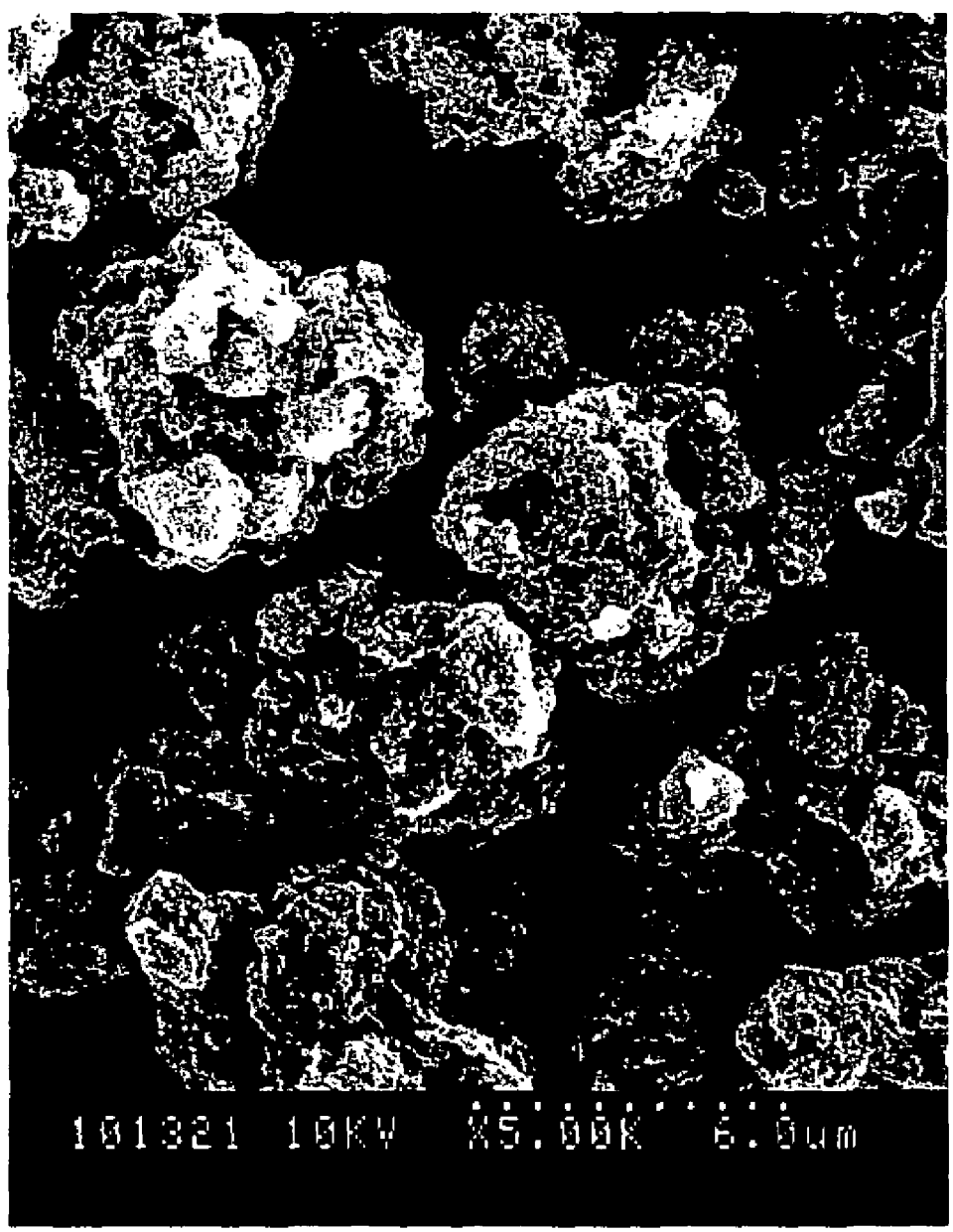
FIG. 4 is a scanning electron microphotograph (magnification of 5000 times) of alkaline earth metal basic silicate particles of the present invention.
Figure 5:
FIG. 5 is a scanning electron microphotograph (magnification of 5000 times) of magnesium hydroxide particles.

FIG. 4 in the attached drawing is a scanning electron microphotograph of the alkaline earth metal basic silicate particles of the present invention, and FIG. 5 is a scanning electron microphotograph of the magnesium hydroxide used as a starting material. The particles of FIG. 4 are more rugged and fluffy on the surfaces than those of FIG. 5, and it is considered that the magnesium silicate is existing in these portions.

On the other hand, the basic silicate particles of the Ca type of the invention has an X-ray diffraction image specific to the calcium hydroxide and an X-ray diffraction image specific to the calcium silicate, from which the possession of the calcium silicate is confirmed.

Figure 6:
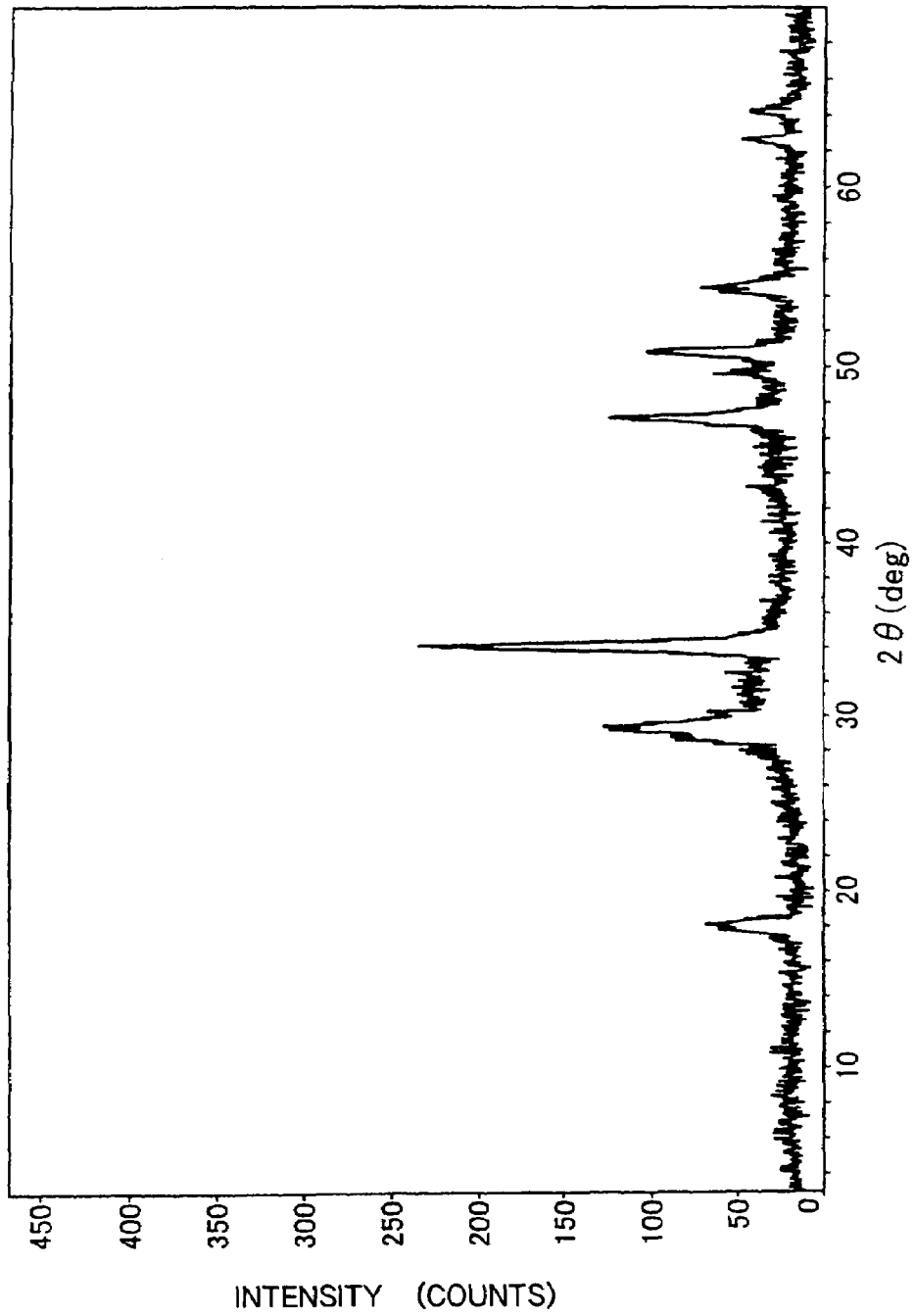
FIG. 6 is a diagram of an X-ray diffraction image of the alkaline earth metal basic silicate particles (Ca type) of the present invention.
Figure 7:
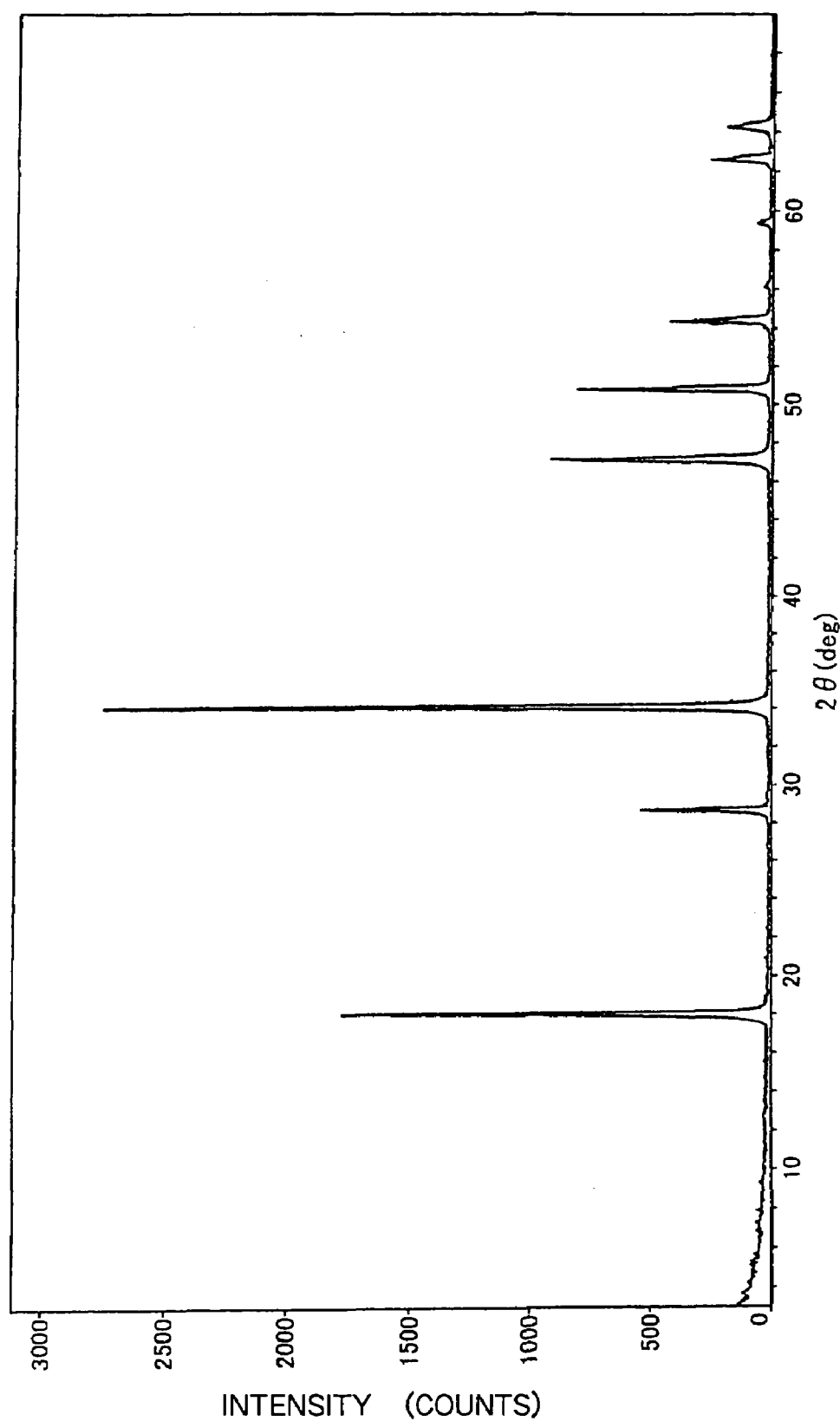
FIG. 7 is a diagram of an X-ray diffraction image of a calcium hydroxide.
Figure 8:
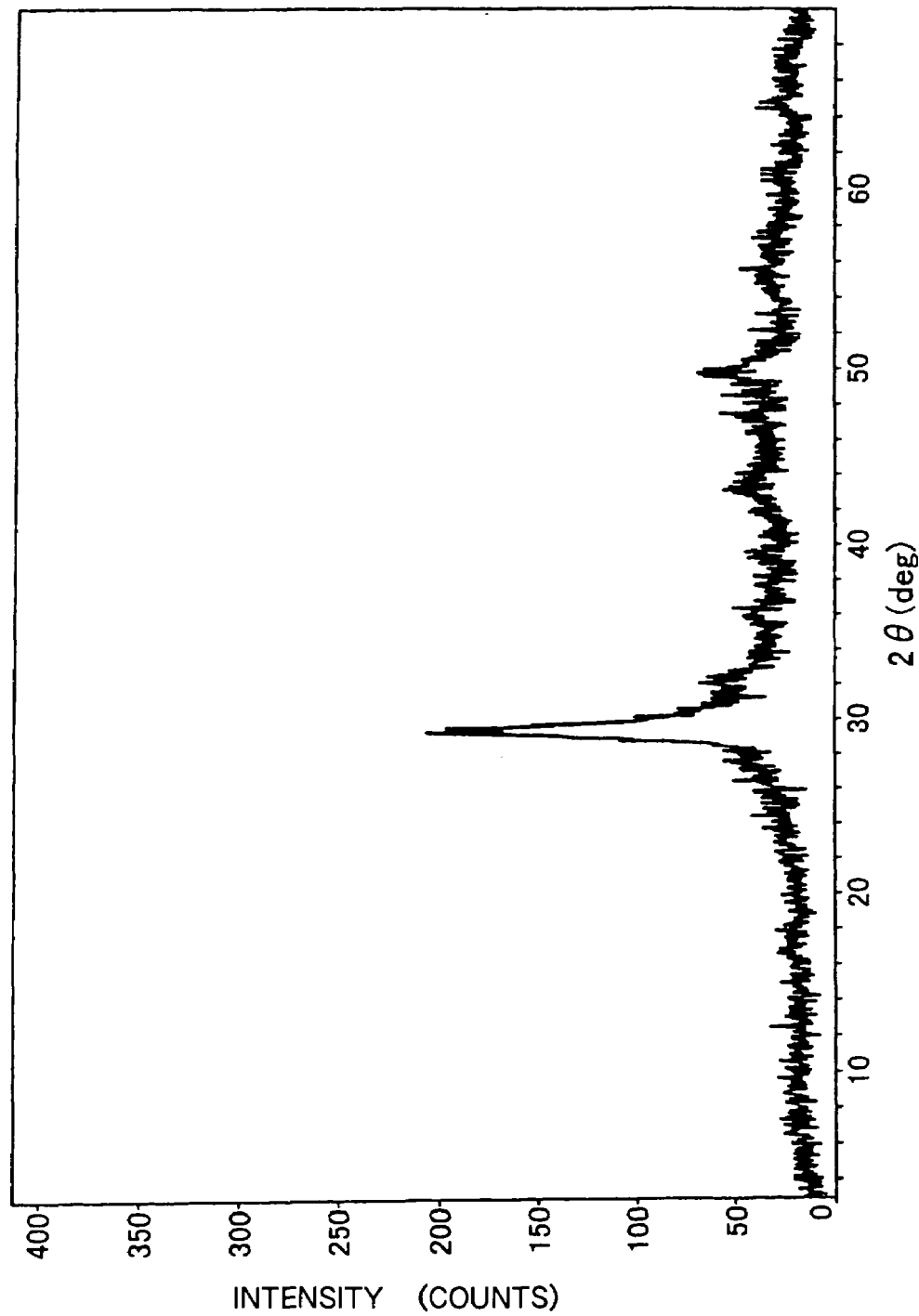
FIG. 8 is a diagram of an X-ray diffraction image of a calcium silicate.

FIG. 6 in the accompanying drawings is an X-ray diffraction image of the basic silicate particles (Example 4) of the Ca type according to the present invention, FIG. 7 is an X-ray diffraction image of the calcium hydroxide which is a starting material, and FIG. 8 is an X-ray diffraction image of the calcium silicate.

From the comparison of these X-ray diffraction images, it is learned that the basic silicate particles of the Ca type of the invention (FIG. 6) exhibits diffraction peaks specific to the calcium hydroxide at $2\theta=15$ to 20 degrees and 30 to 35 degrees, and exhibits diffraction peaks specific to the calcium silicate at $2\theta=25$ to 35.

In the alkaline earth metal basic silicate particles of the present invention, at least part of water exists as water of hydration (water existing as a hydroxyl group). The presence of the water of hydration can be confirmed by the thermogravimetric analysis.

Figure 9:
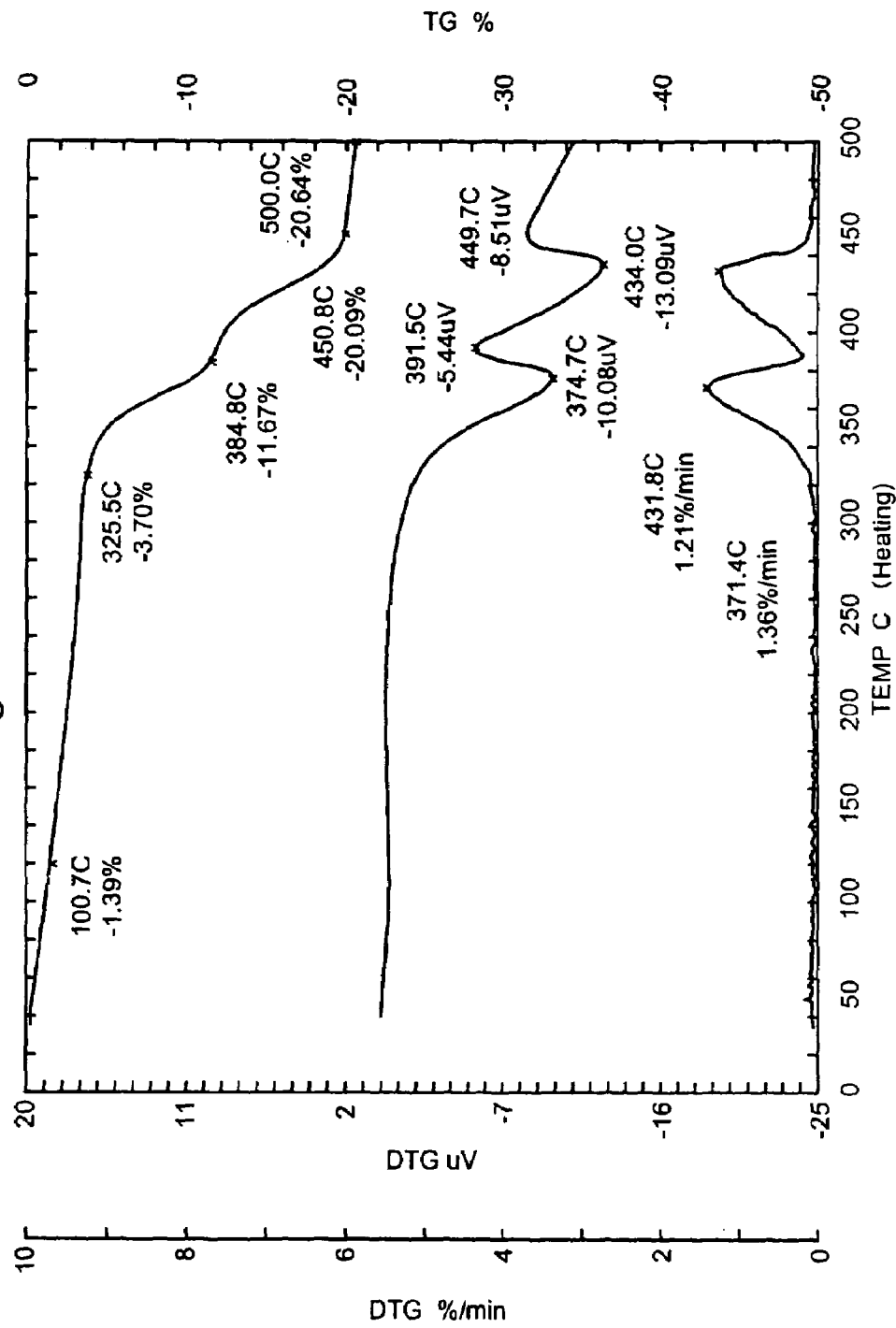
FIG. 9 is a diagram showing curves of differential thermal gravimetric analysis (DTG) of the alkaline earth metal basic silicate particles (Ca-Mg mixed type) according to the present invention.

FIG. 9 is a diagram showing curves of differential thermal gravimetric analysis (DTG) of the alkaline earth metal basic silicate particles (Example 7, Ca—Mg mixed type) according to the present invention. That is, the water of crystallization present in the silicate and the adsorbed water all volatilize at temperatures lower than 350° C. while the water of hydration existing as a hydroxyl group appears as a peak of weight loss at 350 to 450° C.

In the present invention, it is desired that the water of hydration exists at a rate of from 0.1 to 0.99 mols and, particularly, from 0.3 to 0.7 mols per mole of MO (M is an alkaline earth metal).

When the amount of water of hydration is smaller than the above range, the heat stabilization time of when used as the stabilizer for the chlorine-containing polymer becomes shorter than that of when the amount of water of hydration lies within the above range, which is not desirable. When the amount of water of hydration exceeds the above range, on the other hand, the initial coloring tendency increases when used as the stabilizer for the chlorine-containing polymer.

[Preparation of Alkaline Earth Metal Basic Silicate Particles]

The alkaline earth metal basic silicate particles according to the present invention are produced by heating alkaline earth metal hydroxide particles and amorphous silicic acid in an aqueous medium under a non-milling condition, and forming an alkaline earth metal silicate on the surfaces of the hydroxide particles based upon the reaction of the alkaline earth metal hydroxide and the amorphous silicic acid, followed by dry solidification.

According to this method, the amorphous silicic acid dissolves in trace amounts in an alkaline aqueous medium, the dissolved silicic acid reacts with the alkaline earth metal hydroxide on the surfaces of the particles to thereby form a silicate of the alkaline earth metal thereon. This imparts excellent property for preventing the initial coloring. Namely, the production method of the present invention utilizes a chemical wet deposition method (CWD) which is easy to operate offering an advantage of high productivity.

According to the present invention, therefore, it is very important to conduct the reaction of the alkaline earth metal hydroxide particles with the amorphous silicic acid by the heating in an aqueous medium under the non-milling condition. When the reaction is conducted under the milling condition, there is simply obtained a mixture of the alkaline earth metal hydroxide and the silicate, without making it possible to obtain a particulate structure specific to the basic silicate particles of the invention in that the alkaline earth metal silicate is formed on the surfaces of the alkaline earth hydroxide particles. According to the above Japanese Patent No. 3153636 (Japanese Unexamined Patent Publication (Kokai) No. 1898/1994) filed by the present applicant, the magnesium hydroxide and the amorphous silicic acid are reacted under the milling condition, and there is simply obtained a mixture of the magnesium phyllosilicate and the magnesium hydroxide offering, however, neither the initial color-preventing property nor the heat stabilizing action which are specific to the basic silicate particles of the present invention.

In the present invention, the non-milling condition stands for a mild stirring condition (e.g., the stirring rate is not larger than 30 m/s) in which the particle shape and particle diameter of the alkaline earth metal hydroxide particles used as the starting material are substantially maintained.

As the alkaline earth metal hydroxide used for the production of the basic silicate particles of the present invention, there can be used the calcium hydroxide (slaked lime) and the magnesium hydroxide.

The slaked lime may be an industrial lime (JIS R 9001) of any one of the special grade, grade 1 or grade 2. Not being limited thereto only, further, there can be used the one for any other purpose, such as the slaked lime for plastering. As the magnesium hydroxide, there can be used either the natural one or the synthetic one. It is further desired that the slaked lime is in a fine powdery form having a particle diameter of not larger than 10 μm.

The basic silicate particles of the above Ca type are obtained when the slaked lime is used, and the basic silicate particles of the above Mg type are obtained when the magnesium hydroxide is used.

It is allowable to use the calcium hydroxide (slaked lime) and the magnesium hydroxide in combination, as a matter of course. In such a case, there are obtained basic silicate particles (Ca—Mg mixed type) in which those of the Ca type and those of the Mg type are mixed together. In the basic silicate particles of the above mixed type, the calcium hydroxide particles and the magnesium hydroxide particles are being mixed together as the alkaline earth metal hydroxide particles, a trace amount of magnesium silicate is formed in addition to the calcium silicate on the surfaces of the calcium hydroxide particles, and a trace amount of calcium silicate is formed on the surfaces of the magnesium hydroxide particles.

In the basic silicate particles of the above mixed type, the molar ratio of Ca/Mg is from 0.01 to 100 and, preferably, from 0.05 to 20 so as to obtain further enhanced initial color-preventing property, blooming resistance and heat stabilizing action (see Example 6 appearing later). To produce the basic silicate particles of the mixed type, therefore, it is desired to use the calcium hydroxide (slaked lime) and the magnesium hydroxide at a Ca/Mg molar ratio that lies within the above-mentioned range.

As the amorphous silicic acid to be reacted with the above alkaline earth metal hydroxide, there can be used white carbon, wet method amorphous silica (precipitation method silica or gelling method silica), or amorphous silica obtained by treating clay mineral of the smectite group with an acid. It is desired that the amorphous silicic acid usually has a BET specific surface area of from 150 to 400 m$^2$/g and has a secondary particle diameter in a range of from 1 to 10 μm.

The above alkaline earth metal hydroxide and the amorphous silicic acid are used in such amounts that the molar ratio (SiO$_2$/MO) of SiO$_2$ and MO (M is an alkaline earth metal such as Ca or Mg) lies in the above-mentioned range (from 0.01 to 0.9 and, particularly, from 0.05 to 0.70).

When the Mg type basic silicate particles are to be produced in this case, it is desired that the alkaline earth metal hydroxide and the amorphous silicic acid are used in amounts of a ratio that lies in a range of, preferably, from 0.05 to 0.40, more preferably, from 0.05 to 0.30 and, most preferably, from 0.10 to 0.25. Further, when the basic silicate particles of the mixed type are to be produced, there are used the calcium hydroxide, magnesium hydroxide and amorphous silicic acid at a Ca/Mg molar ratio that lies within the above range and in a manner that the total amount of CaO and MgO satisfies the above SiO$_2$/MO molar ratio.

The alkaline earth metal hydroxide and the amorphous silicic acid are reacted together in a manner that the two are wet-mixed and heated. As described above, however, the mixing and the reaction by heating must be carried out under the non-milling condition. The heating temperature (reaction temperature) is preferably in a range of from 50 to 100° C. and, particularly, from 80 to 98° C., and the reaction time is usually from about 1 to about 10 hours.

After the reaction has been finished, the obtained slurry is dry-solidified by vaporization to obtain desired alkaline earth metal basic silicate particles.

The thus obtained basic silicate particles of the invention have a BET specific surface area of, usually, from 10 to 200 m$^2$/g and, preferably, from 20 to 150 m$^2$/g, and an oil-absorbing amount of from 10 to 150 ml/100 g and, particularly, from 30 to 120 ml/100 g. It is further desired that the median diameter based on the volume is in a range of from 0.1 to 20 μm.

(Use)

The above-mentioned basic silicate particles of the present invention can be used alone or in a combination with other stabilizers, as a stabilizer for the chlorine-containing polymers to markedly improve the heat stability of the chlorine-containing polymers, to lower the initial coloring and to effectively relax defects of other stabilizers that are used in combination.

As required, further, the basic silicate particles can be used after having been treated for their surfaces by the addition of ammonium stearate or the like. The surface treatment helps improve dispersion in the chlorine-containing polymers.

As other stabilizers used in combination with the basic silicate particles of the present invention, there can be exemplified zeolite, organotin stabilizer and/or perchloric acid.

-Zeolite-

When used in combination with, for example, zeolite, the basic silicate particles of the present invention work to greatly improve the heat stability of the chlorine-containing polymers.

The zeolite is not limited to those of the natural ones or synthetic ones, but may be those of, for example, the A-type, X-type, Y-type, Pc-type or L-type, or analcime, chabzite, mordenite, erionite or clinoptylorite. It is, of course, allowable to use the zeolite exchanged with ions such as of Ca, Zn, Mg, Sn, Ti or Pb as a matter of course. In general, the A-type zeolite has a cation exchange capacity of from 400 to 550 meq/100 g, the Y-type zeolite has about 370 meq/100 g, and the X-type zeolite has about 470 meq/100 g. It is desired that the zerolite that is used in combination has an average particle diameter of from 0.01 to 20 μm and, particularly, from 0.1 to 5 μm. It is desired that the basic silicate particles of the invention and the zeolite are used at a weight ratio of from 0.5:9.5 to 9.5:0.5 and, preferably, from 2:8 to 8:2.

-Organotin Stabilizer-

The organotin stabilizer has been known by itself, is excellent in regard to improving the heat stability of the chlorine-containing polymer, and has now been most generally used. However, the organotin stabilizer tends to lower the softening point of the chlorine-containing polymer such as vinyl chloride resin and, further, tends to corrode the metal mold used for molding the resin. Further, use of the organotin stabilizer produces smell, causes sulfate contamination and drives up the cost. It has therefore been desired to use a substitute for the organotin stabilizer or to use it in decreased amounts. However, another stabilizer having properties comparable to those of the organotin stabilizer has not yet been found. Besides, if the organotin stabilizer is blended in decreased amounts, the chlorine-containing polymer is initially colored to a large extent and the heat stability is deteriorated, either. According to the present invention, on the other hand, owing to the use of the organotin stabilizer in combination, the basic silicate particles are very useful working to greatly improve properties such as the initial coloring and heat stability and, hence, making it possible to decrease the amount of use of the organotin stabilizer.

When, for example, a resin composition obtained by being blended with 3 parts by weight of the organotin stabilizer per 100 parts by weight of the chlorine-containing polymer, is subjected to the Geer's oven heat testing at 190° C., the blackening time is of the order of 110 minutes. However, the resin composition blended with 2 parts by weight of the organotin stabilizer and 1 part by weight of the basic silicate particles of the present invention possesses the blackening time that is extended to not shorter than 160 minutes. It is therefore learned that the present invention makes it possible to markedly improve the heat stability despite the organotin stabilizer is blended in decreased amounts.

As pointed out already, further, the basic silicate particles of the present invention exhibits the coloring tendency of the warm color system while the organotin stabilizer exhibits the coloring tendency of the cold color system like other transition metal compounds. Therefore, use of the basic silicate particles of the present invention in combination with the organotin stabilizer offers an advantage of preventing the coloring into a particular color.

As the organotin stabilizer that can be used in combination with the above basic silicate particles according to the present invention, there can be used any known ones without limitation, such as alkylmercaptotin stabilizer, organotin mercaptides having an alkyl group bonded to tin atom, organotin mercaptide sulfides, and organotin mercaptocarboxylates.

As the organotin mercaptides, there can be exemplified diorganotin mercaptides such as dibutyltin bis(laurylmercaptide), dimethyltin bis(stearylmercaptide), dioctyltin bis(mercaptoethyl tall oil fatty acid ester), dioctyltin bis(2-mercaptoethylcaprylate), dibutyltin(mercaptoethyl tall oil fatty acid ester), dimethyltin bis(mercaptoethyl stearate), dioctyltin bis(isooctylthioglycolate), dioctyltin bis(2-ethylhexylthioglycolate), dioctyltin bis(dodecylthioglycolate), dioctyltin bis(tetradecylthioglycolate), dioctyltin bis(hexadecylthioglycolate), dioctyltin bis(octadecylthioglycolate), dioctyltin bis(C12–16 mixed alkylthioglycolate), dibutyltin (isooctylthioglycolate), dimethyltin bis(isooctyl mercaptopropionate), bis(2-mercaptocarbonylethyl)tin bis(isooctylthioglycolate), and bis(2-butoxycarbonylethyl)tin bis(butylthioglycolate); and monoorganotin mercaptides such as monobutyltin tris(laurylmercaptide), monobutyl-monochlorotin bis(lauryl mercaptide), monooctyltin tris(2-mercaptoethyl caprylate), monobutyltin tris(mercaptoethyl tall oil fatty acid ester), monomethyltin tris(mercaptoethyl tall oil fatty acid ester), monomethyltin tris(mercaptoethyl laurate), monomethyltin tris(mercaptoethyl stearate), monomethyltin tris(mercaptoethyl oleate), monooctyltin tris(isooctylthioglycolate), monooctyltin tris(2-ethylhexylthioglycolate), monooctyltin tris(dodecylthioglycolate), monooctyltin tris(tetradecylthioglycolate), monooctyltin tris(hexadecylthioglycolate), monooctyltin tris(C12–16 mixed alkylthioglycolate), monooctyltin tris(octadecylthioglycolate), monobutyltin tris(isooctylthioglycolate), monobutyltin tris(isooctylmercaptopropionate), monomethyltin tris(isooctylthioglycolate), monomethyltin tris(tetradecylthioglycolate), 2-methoxycarbonylethyltin tris(isooctylthioglycolate), and 2-butoxycarbonylethyltin tris(2-ethylhexylthioglycolate).

As the organotin mercaptide sulfides, there can be exemplified bis[monobutyl di(isooctoxycarbonylmethylenethio)tin]sulfide, bis[dibutylmono(isooctoxycarbonylmethylenethio)tin]sulfide, bis[bis(2-methoxycarbonylethyl)tin isooctylthioglycolate]sulfide, bis(methyltin diisooctylthioglycolate)disulfide, bis(methyl/dimethyltin mono/diisooctylthioglycolate)disulfide, bis(methyltin diisooctylthioglycolate)trisulfide, bis(butyltin diisooctylthioglycolate) trisulfide, bis[methyltin di (2-methylcaptoethylcaprylate) sulfide, and bis[methyltin di(2-mercaptoethylcaprylate)] disulfide.

As the organotin mercaptocarboxylates, there can be exemplified dibutyltin-β-mercaptopropionate, dioctyltin-β-mercaptopropionate, dibutyltin mercaptoacetate, bis(2-methoxycarbonylethyl)tin thioglycolate)tin thioglycolate, and bis(2-methoxycarbonylethyl)tin mercaptopropionate.

In addition to those exemplified above, there can be used organotin carboxylates, such as mono- or dimethyltin, mono- or dibutyltin, octoate of mono- or dioctyltin or of mono- or bis(butoxycarbonylethyl)tin, laurate, myrystate, palmitate, stearate and isostearate.

The above organotin stabilizers can be used in a single kind or in a combination of two or more kinds together with the basic silicate of the present invention. Generally, however, it is desired to use the basic silicate particles and the organotin stabilizer in combination at a weight ratio of from 1:9 to 9:1 and, particularly, from 2:8 to 7:3.

-Perchloric Acid-

The basic silicate particles of the present invention can be used in combination with the perchloric acid. It has been known that the perchloric acid ($HClO_4$) has the action for enhancing the heat stability of the chlorine-containing polymer and many patent applications have been filed without, however, really been used except for only limited applications. That is, the perchloric acid is hygroscopic, cannot be preserved for extended periods of time imposing problems from the standpoint of safety and cost.

Use of the perchloric acid and the basic silicate particles of the present invention in combination makes it possible to alleviate the above-mentioned defects of the perchloric acid and to further improve the heat stability of the vinyl chloride polymer. When the two are to be used in combination, it is desired that the perchloric acid is used in an amount of from 0.1 to 7 parts by weight per 100 parts by weight of the basic silicate particles of the present invention.

-Other Stabilizers-

The basic silicate particles of the present invention can be used in combination with other stabilizers than those described above. When the basic silicate particles of the invention are used in combination with an organotin stabilizer, in particular, it is desired to further use a zinc salt of a higher fatty acid or a resin acid or a boric acid compound in combination.

Use of the zinc salt of a higher fatty acid or a resin acid makes it possible, for example, to improve the initial coloring tendency of the chlorine-containing polymer. It is considered that the effect for improving the initial color stems from the tendency toward achromatic color due to cold color of the zinc compound.

As the higher fatty acid or resin acid that constitutes the zinc salt, there can be exemplified those having 7 to 22 carbon atoms and, particularly, 7 to 18 carbon atoms. The higher fatty acid may or may not be saturated. Examples of the saturated fatty acid include capric acid, undecanoic acid, lauric acid, myrystic acid, palmitic acid, margaric acid, stearic acid and arachic acid. Examples of the unsaturated fatty acid include linderic acid, tsuzuic acid, petroselinic acid, oleic acid, linolic acid, linoleic acid and arachidonic acid. Among them, stearic acid is most desired. The higher fatty acid may be a mixed fatty acid such as beef fatty acid, coconut fatty acid or palm fatty acid. Concrete examples of the resin acid include benzoic acid, cinnamic acid, p-oxycinnamic acid, abietic acid, neoabietic acid, d-pimaric acid, iso-d-pimaric acid, podocarpic acid and agathenedicarboxylic acid.

The zinc salt of the above higher fatty acid or resin acid is used in an amount of from 1 to 30 parts by weight and, particularly, from 3 to 10 parts by weight per 100 parts by weight of the sum of the basic silicate particles of the invention and the organotin stabilizer.

The initial coloring tendency of the chlorine-containing polymer can be improved even by using a boric acid compound in combination. It is considered that the effect for improving the initial color stems from the chelating action of the boric acid compound.

As the boric acid compound, there can be exemplified boric acid, boric anhydride, borate and boric ester. As the boric ester, there can be exemplified trimethyl borate, triethyl borate, triisopropyl borate, tridecyl borate, tris(1,2-propyleneglycol) borate, monoglyceride borate, triphenyl borate, tricresyl borate, tris(p-tertiary butylphenyl) borate, tris(nonylphenyl) borate and octyldiphenyl borate.

The above boric acid compound is used in an amount of from 1 to 30 parts by weight and, particularly, from 3 to 10 parts by weight per 100 parts by weight of the sum of the basic silicate particles of the invention and the organotin stabilizer.

(Chlorine-Containing Polymer Composition)

As described above, the basic silicate particles of the present invention is blended in the chlorine-containing polymer as a stabilizer in a single kind or as a composite stabilizer in combination with other stabilizers.

The above stabilizer or composite stabilizer is used in the form of a one-pack powder or granules. The granular product can be produced by a known granulating method, such as extrusion-molding granulating method, spray granulating method, rotary disk granulating method, rotary granulating method or compression granulating method. At this moment, it is important that the granular structure of the basic silicate particles are not destroyed. The size of the stabilizer particles can be arbitrarily adjusted depending upon the object but is usually in a range of from 50 μm to 5 mm and, particularly, from 70 μm to 2 mm.

The chlorine-containing polymer composition blended with the basic silicate particles exhibits improved initial color as well as strikingly improved heat stability.

In order for the basic silicate particles of the present invention to exhibit the effect for improving the initial color or the heat stability to a sufficient degree, it is desired that the basic silicate particles are blended in an amount of from 0.01 to 10 parts by weight and, particularly, from 0.03 to 5 parts by weight per 100 parts by weight of the chlorine-containing polymer.

As the chlorine-containing polymer which is to be blended with the basic silicate particles of the present invention, there can be exemplified polymers such as polyvinyl chloride, polyvinylidene chloride, chlorinated polyvinyl chloride, chlorinated polyethylene, chlorinated polypropylene, chlorinated rubber, vinyl chloride/vinyl acetate copolymer, vinyl chloride/ethylene copolymer, vinyl chloride/propylene copolymer, vinyl chloride/styrene copolymer, vinyl chloride/isobutylene copolymer, vinyl chloride/vinylidene chloride copolymer, vinyl chloride/styrene/maleic anhydride tercopolymer, vinyl chloride/styrene/acrylonitrile copolymer, vinyl chloride/butadiene copolymer, chlorinated vinyl/propylene chloride copolymer, vinyl chloride/vinylidene chloride/vinyl acetate tercopolymer, vinyl chloride/acrylic ester copolymer, vinyl chloride/maleic ester copolymer, vinyl chloride/methacrylic ester copolymer, vinyl chloride/acrylonitrile copolymer and internally plasticized polyvinyl chloride, as well as polyolefins such as of chlorine-containing polymers thereof with an α-olefin polymer such as polyethylene, polypropylene, polybutene or poly-3-methylbutene, or copolymers thereof, copolymers of a polystyrene, acrylic resin or styrene with other monomers (e.g., maleic anhydride, butadiene or acrylonitrile), as well as blends thereof with an acrylonitrile/butadiene/styrene copolymer, an acrylic ester/butadiene/styrene copolymer, and methacrylic ester/butadiene/styrene copolymer.

The chlorine-containing polymer composition blended with the above basic silicate particles of the invention can be blended with known blending agents according to the known recipe. Though not limited thereto only, examples of the blending agent include metallic soap-type heat stabilizer, plasticizer, lubricant, filler, coloring agent, weather-proofing stabilizer, anti-aging agent, photo-stabilizer, ultraviolet-ray absorber, anti-static agent, reinforcing agent, reforming resin or rubber, basic inorganic compound, perchlorate, epoxy compound, salt of fatty acid, ester of fatty acid, polyhydric alcohol or ester thereof, antibacterial agent, chelating agent, and antioxidizing agent.

The chlorine-containing polymer composition is mixed or blended according to a known method, and is molded according to various molding methods such as extrusion molding, injection molding, compression molding, inflation, calender working or coating. Or, the coloring is effectively prevented by conducting the molding in an atmosphere which is not in contact with the air as much as possible or in an inert gas atmosphere.

EXAMPLES

The invention will now be described in further detail by way of the following Examples. The testing was conducted by way of the following methods.

(1) Secondary Ion Mass Spectrometry (SIMS).

Measured by using the Model 6300, manufactured by PHI Co. The measuring conditions were as follows:

| | |
|---|---|
| Monitor elements: | Si, Ca, Mg |
| Kind of primary ions: | Cs+ |
| Primary ion acceleration energy: | 3 keV |
| Primary ion incidence angle: | 60 degrees |
| Raster size: | 300 μm |
| Analyzing region (area): | 9% |
| Polarity of secondary ions: | negative ions |
| Oxygen leak: | No |
| Charge compensation: | Yes |
| Electrically conducting coating: | No |

The depth of abscissa of FIG. 3 was calculated by using the sputtering rate of a glass.

The samples were measured twice, and their average values were used as silicification intensity ratios.

(2) SEM Photograph.

The samples were photographed by using a scanning electron microscope (S570 manufactured by Hitachi, Ltd.) to observe the surface states.

(3) X-Ray Diffraction Measurement.

Measured with Cu-Kα by using a RINT 2000 System manufactured by Rigaku Denki Co.

| | |
|---|---|
| Target: | Cu |
| Filter: | curved crystalline graphite monochrometer |
| Detector: | scintillation counter |
| Voltage: | 40 kV |
| Current: | 20 mA |
| Scanning speed: | 3°/min |
| Step sampling: | 0.05° |
| Slit: | DS1° RS0.15 mm SS1° |
| Illumination angle: | 6° |

(4) Scanning Thermogravimetric Analysis (DTG).

Measured by using an SSC-5200TG-DTA System Manufactured by Seiko Denshi Kogyo Co.

(5) BET Specific Surface Area.

Measured in compliance with the BET method by using a Countersorb manufactured by Yuasa Ionics Co.

(6) Oil-Absorbing Amount.

Measured in compliance with JIS.K.6220.

(7) Average Particle Diameter.

Average particle diameter was measured by using a Particle Size Analyzer, Model LS230 manufactured by Coulter Co.

(8) Acid Resistance Testing (pH-stat Method).

The acid resistance testing was conducted by using an automatic stat titration device AUT-201 manufactured by To a Denpa Kogyo Co.

Measuring Conditions;

50 Milliliters of ion-exchanged water and 50 mg of a sample were added to a 50-ml beaker and were maintained at 25° C. with stirring. Then, by using the automatic stat titration device, 0.1N HCL was automatically added so as to maintain a pH 4.0. Relationships between the dissolving amount (% by mol) of the samples and the time (min) were plotted to measure the acid resistance. When the alkaline earth metal was calcium, 0.1N HCL were automatically poured to maintain pH 11.5 to find the dissolving amounts of the samples.

(9) Initial Color.

A vinyl chloride sheet was introduced into the Geer's oven and was taken out after 20 minutes have passed to evaluate the colored state of the sheet by eyes.

(10) Intermediate Coloring Property.

The colored state of the sheet taken out 60 minutes after being heated in the Geer's oven was evaluated by eyes in the same manner as the above initial color.

(11) Blackening Time.

The time until the sheet was completely blackened was measured under the Geer's oven heating conditions.

(12) Laboplusto-Mill Deterioration Time (Dynamic Heat Resistance Time).

By using a Laboplusto-mill, Model 20R200, manufactured by Toyo Seiki Mfg. Co., the time until the blend was deteriorated by decomposition was measured under the following conditions.

| | |
|---|---|
| Casing temperature: | 200° C. |
| Rotor rotational speed: | 50 rpm |
| Feeding amount: | 62 g |

(13) Hydrogen Chloride Trap-Holding Time (H.T.).

In compliance with the JIS K-6723, the vinyl chloride sheet was cut into pieces of 1 mm×1 mm. 2 Grams of the sample chips were introduced into a test tube furnished with a Congo Red paper, and the test tube was introduced into an oil bath heated at a predetermined temperature to measure the hydrogen chloride desorption time due to the heat decomposition of the vinyl chloride.

(14) Vicat Softening Point.

By using a softening temperature-measuring device (Model S-3M) manufactured by Toyo Seiki Mfg. Co., measurement was taken in compliance with JIS K-7206 (Vicat softening temperature testing method) under the following conditions.

| | |
|---|---|
| Load: | 1000 g |
| Temperature-raising rate: | 120° C./hr |

(15) Choking Degree.

The hard vinyl chloride sheet was exposed to the outdoors, and the choking degree of the sheet was evaluated by eyes.

(16) Blooming Resistance.

A soft vinyl chloride sheet was immersed in hot water maintained at 70° C., taken out 7 days thereafter, and the presence of blooming (cloudiness on the sheet surface) on the sheet was evaluated by eyes.

The following magnesium hydroxide, amorphous silicic acid, calcium hydroxide and calcium silicate were used in the Examples.

| | |
|---|---|
| Magnesium hydroxide: | #200, manufactured by Kamishima Kagaku Co., MgO content = 66% by weight |
| Amorphous silicic acid: | Carplex #80D, manufactured by Shionogi Pharmaceutical Co. |
| Calcium hydroxide: | fine powder of special grade, manufactured by Ryoukou Sekkai Kogyo Co., purity = 98% by weight |
| Calcium silicate: | manufactured by Mizusawa Industrial Chemicals, Ltd. Kogyo Co., $SiO_2$/CaO molar ratio of 1.25. |

Example 1

Mg-Type Basic Silicate Particles

55 Grams of a magnesium hydroxide and 6 g of an amorphous silicic acid were suspended in 400 ml of ion-exchanged water in a 1000-ml beaker to conduct the reaction with mild stirring at 95° C. ($SiO_2$/MgO molar ratio=0.1/0.9).

After 4 hours have passed, the final pH remained stable at about 9.8 indicating the termination of the reaction.

The obtained slurry was transferred into a stainless steel vat, dry-solidified by vaporization at 110° C. overnight, and was pulverized by using a sample mill to obtain a white powder.

FIG. 4 is a scanning electron microphotograph of the powder.

Example 2

Mg-Type Basic Silicate Particles

The reaction was carried out in the same manner as in Example 1 but changing the amounts of the magnesium hydroxide and the amorphous silicic acid such that the $SiO_2/MgO$ molar ratio was 0.2/0.8 (pH when the reaction has terminated was about 9.7) to obtain a white powder.

Example 3

Ca-Type Basic Silicate 68.0 Grams of a calcium hydroxide and 6 g of an amorphous silicic acid were suspended in 400 ml of ion-exchanged water in a 1000-ml beaker to conduct the reaction with mild stirring at 95° C. ($SiO_2/CaO$ molar ratio=0.1/0.9).

After 4 hours have passed, the final pH remained stable at about 12.9 indicating the termination of the reaction.

The obtained slurry was transferred into a stainless steel vat, dry-solidified by vaporization at 110° C. overnight, and was pulverized by using a sample mill to obtain a white powder.

Example 4

Ca-Type Basic Silicate

The reaction was carried out in the same manner as in Example 3 but changing the amounts of the calcium hydroxide and the amorphous silicic acid such that the $SiO_2/CaO$ molar ratio was 0.2/0.8 (pH when the reaction has terminated was about 12.8) to obtain a white powder.

Example 5

Ca-Type Basic Silicate

The reaction was carried out in the same manner as in Example 3 but changing the amounts of the calcium hydroxide and the amorphous silicic acid such that the $SiO_2/CaO$ molar ratio was 0.3/0.7 (pH when the reaction has terminated was about 12.7) to obtain a white powder.

FIG. 6 shows an X-ray diffraction image of the powder.

Example 6

Ca—Mg Mixed-Type Basic Silicate 49.5 Grams of a magnesium hydroxide, 5.2 g of a calcium hydroxide and 6 g of an amorphous silicic acid were suspended in 400 ml of ion-exchanged water in a 1000-ml beaker to conduct the reaction with mild stirring at 95° C. for 4 hours ($SiO_2/(MgO+CaO)$ molar ratio=0.1/(0.81+0.09)).

Thereafter, ammonium stearate was added at a feeding weight ratio of 2%, and the surface treatment was conducted by further continuing mild stirring for 30 minutes.

The obtained slurry was transferred into a stainless steel vat, dry-solidified by vaporization at 110° C. overnight, and was pulverized by using a sample mill to obtain a white powder.

Example 7

Ca—Mg Mixed-Type Basic Silicate

A white powder was obtained in the same manner as in Example 6 but changing the amounts of the magnesium hydroxide, calcium hydroxide and amorphous silicic acid such that the $SiO_2/(MgO+CaO)$ molar ratio was 0.2/(0.32+0.48)).

FIG. 9 shows a differential thermal mass spectrometric curve (DTG) of the powder.

Example 8

Ca—Mg Mixed-Type Basic Silicate

A white powder was obtained in the same manner as in Example 6 but changing the amounts of the magnesium hydroxide, calcium hydroxide and amorphous silicic acid such that the $SiO_2/(MgO+CaO)$ molar ratio was 0.2/(0.16+0.64)).

Example 9

Ca—Mg Mixed-Type Basic Silicate

A white powder was obtained in the same manner as in Example 6 but adding a perchloric acid at a feeding weight ratio of 2% instead of adding the ammonium stearate after the reaction has been terminated.

Example 10

Ca—Mg Mixed-Type Basic Silicate

A white powder was obtained in the same manner as in Example 8 but adding a monoglycerine stearate at a feeding weight ratio of 3% instead of adding the ammonium stearate after the reaction has been terminated.

Comparative Example 1

The starting magnesium hydroxide was directly used.

FIG. 5 is a scanning electron microphotograph thereof.

Comparative Example 2

A talc ($3MgO \cdot 4SiO_2 \cdot H_2O$) was used.

Comparative Example 3

A mixed powder was prepared by mixing the magnesium hydroxide and the talc such that the $SiO_2/MgO$ molar ratio was 0.1/0.9 (same as in Example 1).

Comparative Example 4

The starting calcium hydroxide was directly used.

Comparative Example 5

A white powder was obtained by conducting the reaction in the same manner as in Example 3 but changing the amounts of the calcium hydroxide and the amorphous silicic acid such that the $SiO_2/CaO$ molar ratio was 0.6/0.4.

Comparative Example 6

A white powder was obtained by conducting the reaction in the same manner as in Example 3 but changing the amounts of the calcium hydroxide and the amorphous silicic acid such that the $SiO_2/CaO$ molar ratio was 0.005/0.995.

Comparative Example 7

A mixed powder of the calcium hydroxide and the calcium silicate was prepared in a manner that the $SiO_2/CaO$ molar ratio was 0.3/0.7 (same as in Example 5).

Reference Example 1

A white powder was obtained by conducting the reaction in the same manner as in Example 3 but changing the amounts of the calcium hydroxide and the amorphous silicic acid such that the $SiO_2/CaO$ molar ratio was 0.4/0.6.

Comparative Example 8

A mixed powder of the magnesium hydroxide and the amorphous silicic acid was prepared in a manner that the $SiO_2/MgO$ molar ratio was 0.2/0.8 (same as in Example 2).

Comparative Example 9

A mixed powder of the magnesium hydroxide and the talc was prepared in a manner that the $SiO_2/MgO$ molar ratio was 0.2/0.8 (same as in Example 2).

Comparative Example 10

A mixed powder of the calcium hydroxide and the amorphous silicic acid was prepared in a manner that the $SiO_2/CaO$ molar ratio was 0.2/0.8 (same as in Example 4).

Comparative Example 11

A mixed powder of the calcium hydroxide and the calcium silicate was prepared in a manner that the $SiO_2/CaO$ molar ratio was 0.2/0.8 (same as in Example 4).

Comparative Example 12

A white powder was obtained by conducting the reaction in the same manner as in Example 3 but changing the amounts of the calcium hydroxide and the amorphous silicic acid such that the $SiO_2/CaO$ molar ratio was 0.55/0.45.

(Experiment 1)

Sample powders obtained in Examples 1 to 8 and in Comparative Example 1 were measured for their properties to find the results as shown in Table 1.

TABLE 1

|  | Molar ratio | BET specific surface area ($m^2/g$) | Oil-absorbing amount (ml/100 g) | Average particles diameter (μm) | Silicate intensity ratio ($RI_{400}$) |
| --- | --- | --- | --- | --- | --- |
| Ex. 1 | $SiO_2/MgO$ = 0.1/0.9 | 102 | 51 | 4.6 | 0.065 |
| Ex. 2 | $SiO_2/MgO$ = 0.2/0.8 | 126 | 63 | 5.5 | 0.14 |
| Ex. 3 | $SiO_2/CaO$ = 0.1/0.9 | 98 | 55 | 6.3 | — |
| Ex. 4 | $SiO_2/CaO$ = 0.2/0.8 | 129 | 97 | 6.7 | — |
| Ex. 5 | $SiO_2/CaO$ = 0.3/0.7 | 141 | 112 | 7.9 | — |
| Ex. 6 | $SiO_2/(MgO + CaO)$ = 0.1/(0.81 + 0.09) | — | — | — | — |
| Ex. 7 | $SiO_2/(MgO + CaO)$ = 0.2/(0.32 + 0.48) | — | — | — | — |
| Ex. 8 | $SiO_2/(MgO + CaO)$ = 0.2/(0.16 + 0.64) | — | — | — | — |
| Comp. Ex. 1 | $Mg(OH)_2$ | — | — | — | 0.00032 |

(Experiment 2)

The powders of Examples 1, 2 and of Comparative Example 1 were calculated by SIMS for their silicification intensity ratios in the direction of depth from the surface of the particles. The results were as shown in FIG. 3.

(Experiment 3)

A hard vinyl chloride sheet obtained under the following conditions for preparing a blend composition was measured for its initial color and blackening time. The results were as shown in Table 2.

(Conditions for Preparing the Blend Composition)

The following blend composition A was kneaded by using a 4-inch roll mill at 160° C. for 3 minutes to obtain a sheet having a thickness of 0.5 mm.

| Blend composition A | parts by weight |
|---|---|
| PVC (polymerization degree = 1050) | 100 |
| Zinc stearate | 0.7 |
| Dipentaerythritol | 0.7 |
| Sample of Example or Comparative Example | 0.7 |

Example 4

A hard vinyl chloride sheet obtained under the following conditions for preparing a blend composition was measured for its initial color and blackening time. The results were as shown in Table 2.

(Conditions for Preparing the Blend Composition)

The following blend composition B was kneaded by using a 4-inch roll mill at 160° C. for 3 minutes to obtain a sheet having a thickness of 0.5 mm.

| Blend composition B | parts by weight |
|---|---|
| PVC (polymerization degree = 1050) | 100 |
| Zinc stearate | 0.5 |
| Dipentaerythritol | 0.4 |
| Dibenzoylmethane | 0.1 |
| Heavy calcium carbonate | 3.0 |
| Sample of Example | as shown in Table 2 |
| Zeolite A4 | as shown in Table 2 |

TABLE 2

| Blend composition | Sample*1 (parts by wt.) | Zeolite4A *1 (parts by wt.) | Initial color *2 | Blackening time (min) |
|---|---|---|---|---|
| A | Ex. 1 | 0.7 | | 1 | 100 |
| A | Ex. 2 | 0.7 | | 1 | 90 |
| A | Ex. 4 | 0.7 | | 2 | 140 |
| A | Ex. 5 | 0.7 | | 1 | 120 |
| A | Ex. 6 | 0.7 | | 1 | 110 |
| A | Ex. 7 | 0.7 | | 1 | 120 |
| A | Comp. Ex. 1 | 0.7 | | 3 | 80 |
| A | Comp. Ex. 2 | 0.7 | | 1 | 60 |
| A | Comp. Ex. 3 | 0.7 | | 3 | 70 |
| A | Comp. Ex. 4 | 0.7 | | 3 | 60 |
| A | Comp. Ex. 5 | 0.7 | | 1 | 80 |
| A | Comp. Ex. 6 | 0.7 | | 3 | 60 |
| A | Comp. Ex. 7 | 0.7 | | 2 | 90 |
| A | Ref. Ex. 1 | 0.7 | | 1 | 60 |
| B | Ex. 7 | 0.25 | 0.25 | 1 | 100 |
| B | No sample | | 0.5 | 2 | 80 |

*1: Empty spaces are 0 part by weight.
*2: Initial color evaluated by eyes (Geer's over temperature, 185° C.)
  Evaluation 1 . . . pale yellow
  Evaluation 2 . . . pale orange
  Evaluation 3 . . . dense orange (Experiment 5)

The powders of Example 2 and Comparative Examples 1, 8 and 9 were measured for their relationships between the dissolving amount (% by mol) in HCL and the time (min) based on the pH-stat method. The results were as shown in FIG. 1.

The times required for dissolving 50% by mol calculated as MgO of 50 mg of each of the powders were as shown in Table 3 below.

TABLE 3

| | Ex. 2 | Comp. Ex. 1 | Comp. Ex. 8 | Comp. Ex. 9 |
|---|---|---|---|---|
| Dissolving time | 8 min 27 sec | 2 min 4 sec | 2 min 15 sec | 2 min 57 sec |

(Experiment 6)

The powders of Example 4 and Comparative Examples 4, 10 and 11 were measured for their dissolving amounts (calculated as CaO) when 0.1N HCL was automatically added such that pH was 11.5. The results were as shown in FIG. 2 and in Table 4 below.

TABLE 4

| | Ex. 4 | Comp. Ex. 4 | Comp. Ex. 10 | Comp. Ex. 11 |
|---|---|---|---|---|
| Dissolving amount (mol %) | 47.3 | 81.3 | 78.3 | 60.9 |

(Experiment 7)

By using the sample powders of Examples 3, 4, 5 and 8 and of Comparative Examples 1, 4, 11 and 12, the following blend composition C was kneaded by using a 4-inch roll mill at 160° C. for 3 minutes to obtain sheets having a thickness of 0.5 mm.

| Blend composition C | parts by weight |
|---|---|
| PVC (polymerization degree = 800) | 100 |
| Calcium stearate | 0.3 |
| Polyethylene wax | 0.8 |
| Ester wax | 0.35 |
| Working assistant | 1.55 |
| Sample of Example or Comparative Example | as shown in Table 5 |
| Other stabilizers | as shown in Table 5 |

As other stabilizers, there were used an organotin (dimethyltin mercaptide or octyltin mercaptide), triphenyl borate, perchloric acid and hydrotalcite as shown in Table 5.

The above sheets were measured to obtain results as shown in Tables 5 and 6.

TABLE 5

| Sample | Number of parts blended (by weight) *1 | | | | | Initial color *6 | Intermediate color | Blackening time (min) |
|---|---|---|---|---|---|---|---|---|
| | Organotin | Zn-St *3 | Boric acid *4 | Perchloric acid | Hydrotalcite *5 | | | |
| Ex. 3 | 1 | | 2 | | | 2 | 2 | 160 or longer |
| Ex. 4 | 1 | | 2 | | | 2 | 2 | 160 or longer |
| Ex. 5 | 1 | | 2 | | | 2 | 2 | 160 or longer |
| Ex. 3 | 1 | | 1.5 | | | 2 | 2 | 160 or longer |
| Ex. 3 | 0.75 | | 1.5 | | | 2 | 2 | 160 |
| Ex. 3 | 0.75 | 0.2 | 1.5 | | | 1 | 2 | 160 |
| Ex. 3 | 0.75 | | 1.5 | 0.2 | | 1 | 2 | 160 or longer |
| Ex. 3 | 1 | | 2*² | | | 2 | 2 | 160 or longer |
| Ex. 4 | 1 | | 2 | 0.01 | | 2 | 2 | 160 or longer |
| Ex. 8 | 1 | | 2 | | | 2 | 2 | 150 |
| No sample | | | 3 | | | 1 | 2 | 110 |
| Comp. Ex. 4 | 1 | | 2 | | | 2 | 3 | 140 |
| Comp. Ex. 11 | 1 | | 2 | | | 2 | 3 | 150 |
| Comp. Ex. 12 | 1 | | 2 | | | 2 | 3 | 150 |
| Comp. Ex. 1 | 1 | | 2 | | | 2 | 3 | 120 |
| No sample | | | 2 | | 1 | 2 | 2 | 120 |

*1: Empty spaces are 0 part by weight.
*²Octyltin mercaptide, other organotins are all dimethyltin mercaptides.
*3: Zinc stearate *4: Triphenyl borate
*5: Hydrotalcite (alkamizer-1 manufactured by Kyowa Kagaku)
*6: Initial and intermediate colors evaluated by eyes (Geer's over temp., 190° C.)
Evaluation 1 . . . Faintly pale yellow, Evaluation 2 . . . pale yellow, Evaluation 3 . . . yellow

TABLE 6

| Sample (parts by wt.) | Organotin (parts by wt.) | Laboplustomill deterioration time (min) | H.T. *1 (min) | Vicat softening point (° C.) |
|---|---|---|---|---|
| Ex. 3 | 1 | 1.5 | 20.9 | 46 | 79.2 |
| Ex. 3 | 0.75 | 1.5 | 21.3 | 40 | 79.6 |
| No sample | 0 | 3 | 21.2 | 21 | 75.4 |

*1: Oil bath temperature, 190° C.

(Experiment 8)

By using Example 9, the following blend D was kneaded by using a 4-inch roll mill at 150° C. for 6 minutes to obtain a sheet having a thickness of 1.0 mm.

| Blend composition D | parts by weight |
|---|---|
| Vinyl chloride resin (polymerization degree = 1050) | 100 |
| Di-2-ethylhexyl phthalate | 50 |
| Stearic acid | 0.2 |
| Lead stabilizer | see Table 7 |
| Example 9 | see Table 7 |

The above soft vinyl chloride sheets were measured for their initial color, intermediate color and heat stability depending upon their blending ratios shown in Table 7. The results were as shown in Table 7.

TABLE 7

| Sample | Lead stabilizer | PbO content (%) | Basicity | Number of parts blended (by weight) | | Initial color *2 | Intermediate color | H.T. *3 (min) |
|---|---|---|---|---|---|---|---|---|
| | | | | Pb*¹ | Sample | | | |
| Ex. 9 | tribasic lead sulfate | 88 | 3 | 1.9 | 0.1 | 1 | 2 | 178 |
| Ex. 9 | tetrabasic lead sulfate | 91 | 4 | 1.9 | 0.1 | 1 | 2 | 176 |
| Ex. 9 | dibasic lead stearate | 54 | 2 | 1.9 | 0.1 | 3 | 3 | 50 |
| None | tribasic lead sulfate | 88 | 3 | 2.0 | 0 | 2 | 3 | 160 |
| None | tetrabasic lead sulfate | 91 | 4 | 2.0 | 0 | 2 | 3 | 155 |
| None | dibasic lead stearate | 54 | 2 | 2.0 | 0 | 3 | 5 | 45 |

*¹Lead stabilizer
*2: Initial and intermediate colors evaluated by eyes (Geer's oven temperature, 190° C.
Evaluation 1 . . . pale yellow
Evaluation 2 . . . skin color
Evaluation 3 . . . faint brown
Evaluation 4 . . . brown
Evaluation 5 . . . scorched brown
*3: Oil bath temperature, 180° C.

(Experiment 9)

A hard vinyl chloride sheet obtained under the following conditions for preparing a blend composition was exposed to outdoors to evaluate the choking degree. The results were as shown in Table 8.

(Conditions for Preparing the Blend Composition)

The following blend composition E was kneaded by using a 4-inch roll mill at 160° C. for 3 minutes and was, then, press-molded to obtain a sheet having a thickness of 1.0 mm.

| Blend composition E | parts by weight |
|---|---|
| Vinyl chloride resin (polymerization degree = 700) | 100 |
| Calcium stearate | 0.3 |
| Ester wax | 0.2 |
| Tetrabasic lead sulfate | 3.0 |
| Lead stearate | 0.25 |
| Dibasic lead stearate | 0.2 |
| Sample (see Table 8) | 0.3 |

TABLE 8

| | | Choking degree *1 | | | | | |
|---|---|---|---|---|---|---|---|
| Sample | Lead stabilizer | 3 Months | 6 Months | 9 Months | 12 Months | 18 Months | 24 Months |
| Ex. 9 | tetrabasic lead sulfate | A | A | A | B | B | C |
| None | tetrabasic lead sulfate | A | A | B | C | C | D |

*1: Evaluation of choking degree
Evaluation A . . . none
Evaluation B . . . slightly whitened
Evaluation C . . . whitened
Evaluation D . . . white (Experiment 10)

A soft vinyl chloride sheet obtained under the following conditions for preparing a blend composition was immersed in hot water maintained at 70° C. and was taken out 7 days thereafter to evaluate the blooming of the sheet. The results were as shown in Table 9.

(Conditions for Preparing the Blend Composition)

The following blend composition F was kneaded by using a 4-inch roll mill at 160° C. for 5 minutes and was, then, compression-molded at 170° C. to obtain a sheet having a thickness of 1 mm.

| Blend composition F | parts by weight |
|---|---|
| PVC (polymerization degree = 1050) | 100 |
| Diisononyl phthalate | 50 |
| Hydrotalcite | 2.0 |
| Zinc stearate | 0.65 |
| Calcium stearate | 0.15 |
| Dibenzoylmethane | 0.15 |
| Antioxidant | 0.05 |
| Sample (see Table 9) | 0.1 |

The powders of Example 10 and Comparative Examples 1 and 4 were evaluated for their blooming property. The results were as shown in Table 9 below.

TABLE 9

| Sample | Blooming degree *1 |
|---|---|
| Ex. 10 | 1 |
| No sample | 3 |
| Comp. Ex. 1 | 2 |
| Comp. Ex. 4 | 2 |

*1: Evaluation of blooming degree
Evaluation 1 . . . no blooming
Evaluation 2 . . . considerably blooming
Evaluation 3 . . . conspicuously blooming

The invention claimed is:

1. Alkaline earth metal basic silicate particles having a silicate of an alkaline earth metal on surfaces of an alkaline earth metal hydroxide particles, and having an $SiO_2/MO$ (M is an alkaline earth metal) molar ratio as a whole in a range of from 0.01 to 0.90.

2. Alkaline earth metal basic silicate particles according to claim 1, wherein the alkaline earth metal hydroxide is a calcium hydroxide.

3. Alkaline earth metal basic silicate particles according to claim 1, wherein the alkaline earth metal hydroxide is a magnesium hydroxide.

4. Alkaline earth metal basic silicate particles according to claim 3, wherein a time in which 50 mol % (calculated as MgO) of 50 mg of the basic silicate particles dissolves is not shorter than 5 minutes in the acid resistance testing based on the pH-stat method.

5. Alkaline earth metal basic silicate particles according to claim 3, wherein the alkaline earth metal silicate is a magnesium silicate, and a silicification intensity ratio ($RI_{400}$) as expressed by the following formula (1), $$RI_{400}=A/B \qquad (1)$$

wherein a is a $^{28}Si+$ intensity profile [counts] at 400 nm in the direction of depth from the surfaces of the particles, and B is a $^{25}Mg+$ intensity profile [counts] at 400 nm in the direction of depth from the surfaces of the particles, is not smaller than 0.01 as measured by the secondary ion mass spectrometry (SIMS).

6. Alkaline earth metal basic silicate particles according to claim 3, wherein the $SiO_2/MgO$ molar ratio is in a range of from 0.01 to 0.4.

7. Alkaline earth metal basic silicate particles according to claim 1, wherein the alkaline earth metal hydroxide comprises a calcium hydroxide and a magnesium hydroxide, and a silicate of calcium and/or magnesium is formed on the surfaces of the alkaline earth metal hydroxide.

8. Alkaline earth metal basic silicate particles according to claim 7, wherein the Ca/Mg molar ratio is in a range of from 0.01 to 100.

9. Alkaline earth metal basic silicate particles according to claim 1, further having a peak based on the weight loss at a temperature of from 350 to 450° C. in the scanning thermogravimetric analysis (DTG).

10. Alkaline earth metal basic silicate particles according to claim 1, wherein water of hydration (water existing as a hydroxyl group) is present in an amount of from 0.1 to 0.99 mols per mol of MO.

11. Alkaline earth metal basic silicate particles according to claim 1, further having a BET specific surface area of from 10 to 200 $m^2/g$ and an oil-absorbing amount of from 10 to 150 ml/100 g.

12. Alkaline earth metal basic silicate particles according to claim 1, wherein a median diameter based on the volume is in a range of from 0.1 to 20 μm.

13. A method of producing alkaline earth metal basic silicate particles by heating alkaline earth metal hydroxide particles and amorphous silicic acid in an aqueous medium under a non-milling condition, and forming an alkaline earth metal silicate on the surfaces of the alkaline earth metal hydroxide particles based upon the reaction of the alkaline earth metal hydroxide and the amorphous silicic acid, followed by dry solidification.

14. A stabilizer for chlorine-containing polymers, comprising alkaline earth metal basic silicate particles according to claim 1.

15. A stabilizer for chlorine-containing polymers according to claim 14, further containing zeolite.

16. A stabilizer for chlorine-containing polymers according to claim 14, further containing an organotin stabilizer.

17. A stabilizer for chlorine-containing polymers according to claim 16, wherein the organotin stabilizer is an alkylmercaptotin stabilizer.

18. A stabilizer for chlorine-containing polymers according to claim 16, further containing a zinc salt of a higher fatty acid or a resin acid, or a boric acid compound.

19. A stabilizer for chlorine-containing polymers according to claim 14, further containing a perchloric acid.

20. A chlorine-containing polymer composition containing a stabilizer according to claim 14.

* * * * *